UNITED STATES PATENT OFFICE.

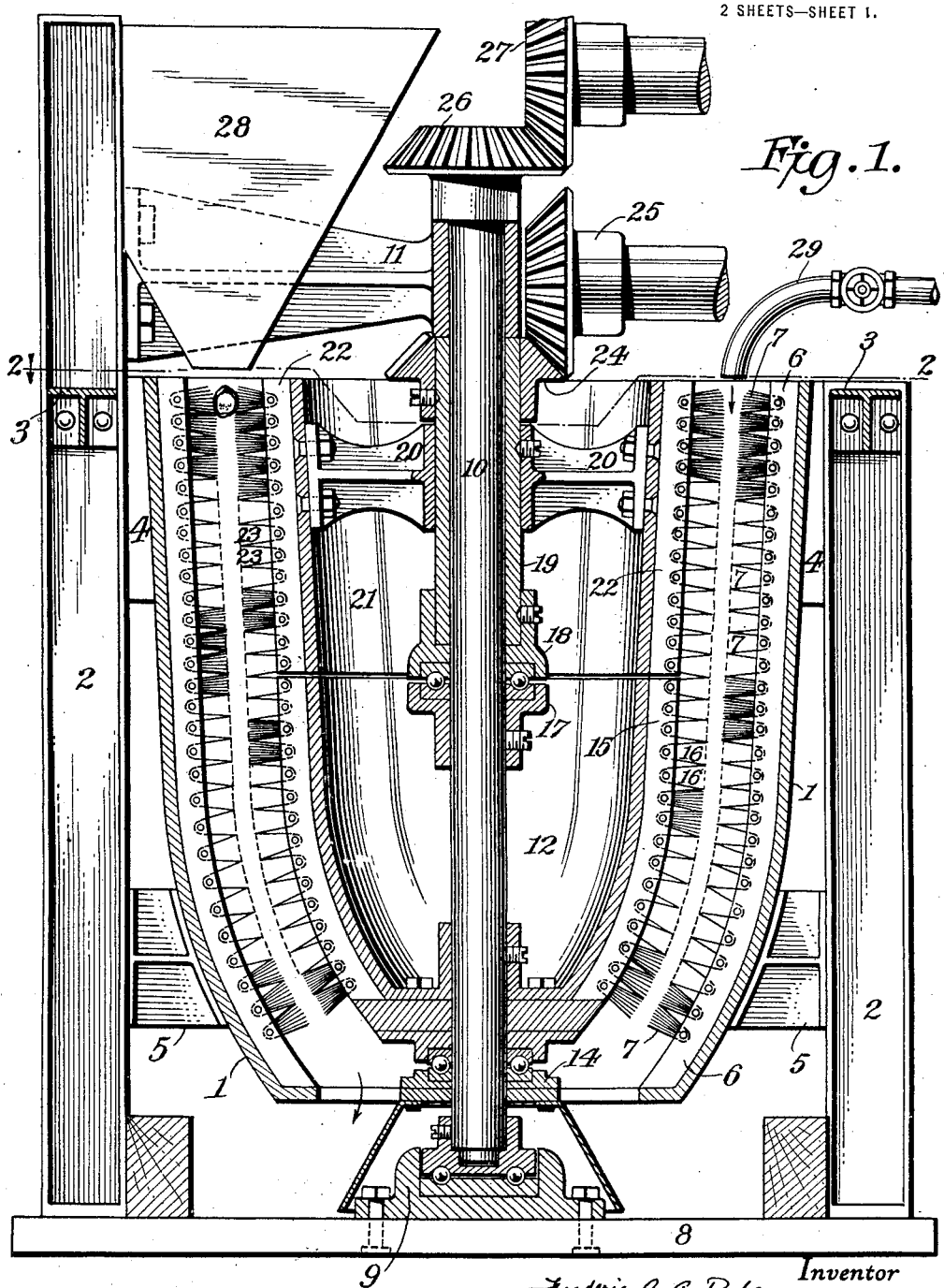

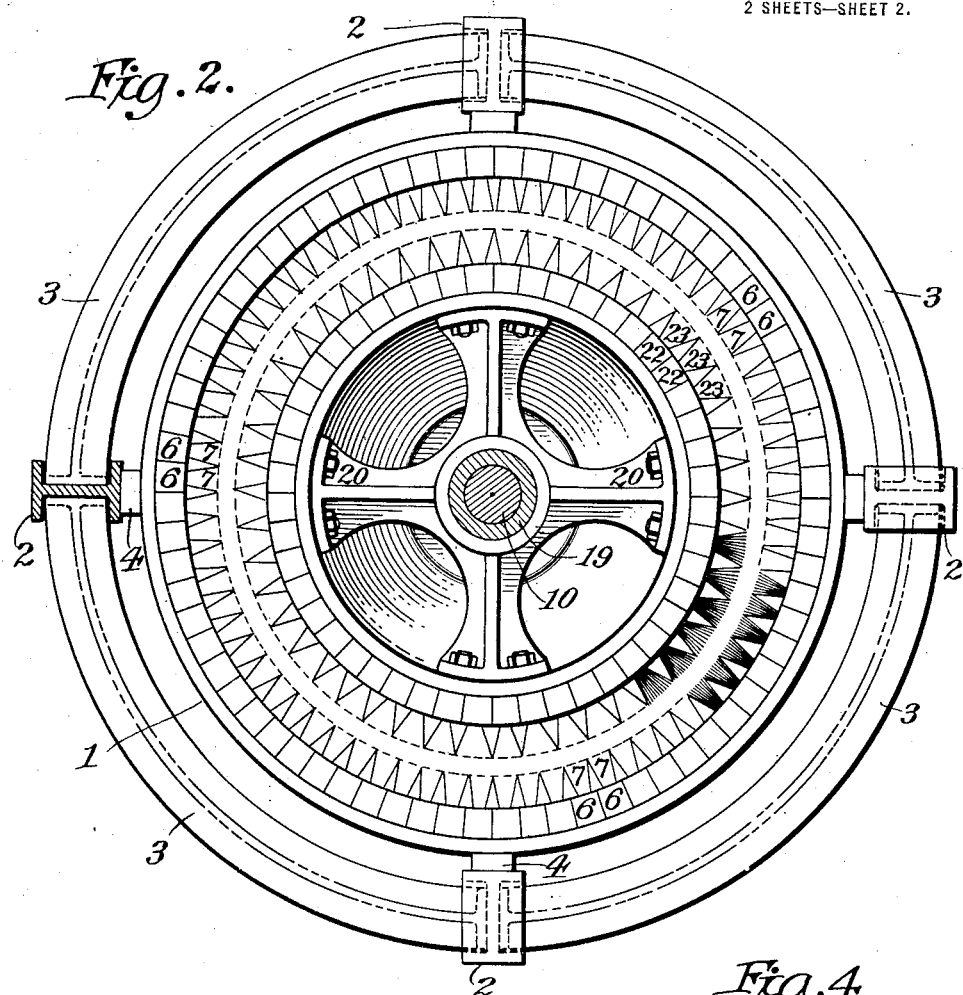
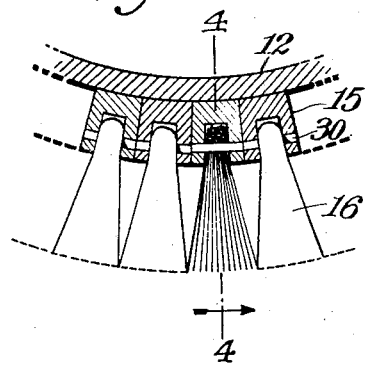
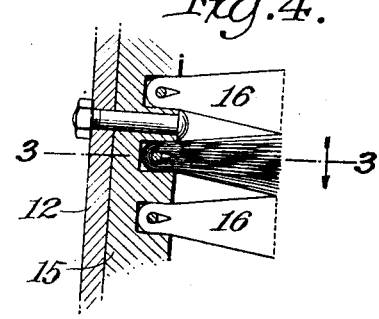

FREDERIC A. G. PAPE, OF NEW YORK, N. Y., ASSIGNOR TO LYMAN N. HINE, OF NEW YORK, N. Y.

APPARATUS FOR REMOVING THE OUTER SHELLS OR HUSKS FROM PALM-NUTS.

1,342,693.  Specification of Letters Patent.  Patented June 8, 1920.

Application filed June 13, 1919, Serial No. 304,025. Renewed April 15, 1920. Serial No. 374,203.

*To all whom it may concern:*

Be it known that I, FREDERIC A. G. PAPE, a subject of Germany, residing at New York city, in the county of New York, State of New York, have invented certain new and useful Improvements in Apparatus for Removing the Outer Shells or Husks from Palm-Nuts; and I do hereby declare the following to be a full, clear, and exact description of the invention, such as will enable others skilled in the art to which it appertains to make and use the same.

The fruits, nuts, or seeds of the *Attalea* (cohune) and other species of palm trees of the Central and South American tropics are provided with a pericarp or husk of varying thickness. This pericarp or husk is the outer of two shells. It is of a fibrous nature of varying density and is impregnated with woody pulp and resinous matter.

In the treatment of such nuts, by cracking or otherwise opening them, for the kernels or seeds which they contain, it is important to remove the outer husks or shells before subjecting them to the cracking or other operation, in order that the machinery employed in the cracking or opening operation may work upon clean nuts without clogging or otherwise impeding it with the outer shells or husks.

The present invention relates to an improved method and apparatus for effecting such removal of the outer husks or shells so that the nuts are rapidly and effectively freed therefrom and supplied in a state free from the outer shell or husk and in large number ready for the cracking operation.

According to the present invention, there is provided an improved husking apparatus in the form of a series of stiff brushes of large working surface made in suitable pattern and of suitable construction for the work in question, and so constructed and arranged that the working surfaces of the brushes impart a strong, scraping motion in different directions. These brushes are caused to move relative to each other, and in different directions, and the nuts to be husked are fed between the brushes and are caused to pass therebetween until the husking operation is completed. During this passage, the nuts are subjected to a combined rotating, rubbing and scraping action and they are advanced transversely to the direction of movement of the brushes relative to each other.

The brushes employed in the improved apparatus and process of the present invention may be advantageously made of metal wire or piassava, of appropriate size and stiffness. The size and shape of the brushes as well as the means for effecting their relative movement to each other, and the supply of the nuts thereo, are capable of wide variation. In the preferred embodiment of the invention, however, the brushes are arranged to rotate with respect to each other, or part of the brushes are arranged to rotate with respect to stationary brushes, and the nuts are fed between the series of brushes so that they are subjected to the dehusking or deshelling operation during the rotation of one or more of this series of brushes.

The invention will be further illustrated by the embodiments thereof illustrated in the accompanying drawings, but it will be understood that the invention is illustrated by, but not limited to, the specific embodiment thus illustrated and described. In the accompanying drawings:

Figure 1 shows an apparatus embodying the invention in central, vertical section and with parts in elevation;

Fig. 2 is a plan view of the apparatus of Fig. 1, taken on the line 2—2 of Fig. 1;

Fig. 3 is an enlarged sectional view showing one form of construction and arrangement of the brushes taken on the line 3—3 of Fig. 4; and Fig. 4 is a sectional view taken on the line 4—4 of Fig. 3.

The apparatus illustrated is vertically arranged and supported. The inverted bell-shaped circular metal vessel or shell 1 is supported by an upright frame made of upright members 2, tie-beams 3, and upper and lower supports 4 and 5, as shown, although the particular means for supporting and strengthening the apparatus are of course capable of wide variation. The supporting frame work is constructed and arranged to hold the outer shell rigidly in place and give it the necessary support. Within this outer shell are arranged a series of brushes made up of the backs 6 in which the wire brushes 7 are suitably secured. These brushes, in the embodiment of the invention illustrated, are in strips conforming in shape to the inner shell 1 and arranged a suitable distance apart around the inner surface of the shell so as to present a substantially continuous brushing surface.

Within the outer series of brushes thus provided there are arranged inner brushes carried by rotating supports. In the apparatus illustrated, the bottom supporting member 8 of the frame is shown as provided with a thrust bearing 9 which supports in part the central shaft 10 and the members mounted thereon. This shaft has a suitable upper bearing indicated conventionally at 11 and a further bearing 14 carried by the outer shell 1.

Mounted upon the lower part of the shaft 10 is the inner inverted bell or shell 12 of the same general contour as the outer shell 1, but of smaller size. This shell 12 is secured to the shaft 10, in any suitable manner so that it will be driven by and will rotate with the shaft. Brush members 15 carrying brushes 16 are secured to the shell 12. These brush members and brushes are of similar construction to the brush members and brushes 6 and 7 and are secured to the inner shell 12 in any suitable manner, for example, by screws or bolts. One suitable securing means is illustrated in Fig. 4. Figs. 3 and 4 likewise illustrate one suitable means for securing the brushes and brush members together and for securing and arranging the brush members and brushes upon their supporting shells. As illustrated in Figs. 3 and 4 the brush members 16 are made of bundles of wires, suitably bent and secured in recesses in the brush frame 15 by means of pins 30 or otherwise; and the brush frames are arranged around the shell 12 in such a way that the brushes 16 will form a substantially continuous brushing surface. In practice, these brushes will usually overlap to a certain extent.

The provision of the inverted bell-shaped members carrying the brushes provides a gradually decreasing space into which the nuts are fed. As the nuts are dehulled they become smaller and would tend to pass too rapidly through the brushes. By the provision of a narrowing path for them, they are crowded together somewhat so that they do not pass too quickly out of the apparatus.

Arranged around the upper part of the shaft 10 is the upper shell 21 secured by means of arms 20 to the sleeve 19 and arranged to rotate therewith upon the shaft 10. The upper rotating shell and sleeve are suitably supported by the bearings 17 and 18. Secured to the shell 21 are similar brush members 22 and brushes 23 to those previously described.

The sleeve 19 and the shell 21 carried thereby are arranged to be rotated by suitable bevel gears 24 and 25 as shown. The shaft 10 and the shell 12 carried thereby are similarly arranged to be rotated by suitable bevel gears 26 and 27. The arrangement is such that the upper shell 21 can be rotated in the direction opposite to that of the lower shell 12.

One or more hoppers 28 are provided for supplying the nuts to the apparatus, and one or more water pipes 29 are also provided for introducing a stream of water into the apparatus upon the nuts being treated. The bottom of the apparatus is open to permit the nuts to pass freely therefrom after they have been freed from their husks or outer shells.

The wooden frames carrying the brushes, and the brushes themselves, are, as above stated, arranged around the inner surface of the outer shell 1 and around the outer surfaces of the inner shells 12 and 21, so that they provide substantially continuous brushing and scraping surfaces. The ends of the brushes are spaced apart a distance approximately equal to the diameter of the palm nut proper after it has been freed from its outer shell or husk. The brushes will accordingly act more lightly upon the nuts that have been freed from all or the greater portion of their outer shells than they will upon the nuts fed to the apparatus and still containing their outer shells.

During the operation of the apparatus the nuts are fed into the space between the brushes from one or more suitable hoppers and are caused to progress gradually down through the space between the rotating and stationary brushes. The nuts are thus subjected to a rapid rubbing and scraping operation at the same time that they are caused to rotate between the surfaces of the stationary and rotating brushes and while they are gradually progressing downward in a direction transverse to the direction of relative movement of the brushes. When the nuts have progressed down to the end of the brushes 23 they come in contact with the lower series of brushes 16 rotating in the opposite direction and their treatment is continued. The process is promoted by the injection of one or more streams of water which impinges constantly upon the brushes and upon the nuts and their separated husks so that the nuts fall out at the bottom perfectly clean and entirely deprived of their enveloping husks or outer shells.

It will be evident that the speed of rotation of the rotating brushes can be varied and that the brushes may be made of larger or smaller size and spaced apart different distances to suit the particular size of the nuts to be treated.

The cohune nuts are of about the size and shape of a duck's egg and have an outer shell or husk of about $\frac{1}{8}$ inch thick, but vary somewhat in thickness. The inner shell is more than double the thickness of the outer shell and is of a most obstinate hardness, and somewhat like stone. Its hardness is such that it is not materially acted upon or injured during the treatment for removing the outer shell or husk and the nut can accordingly be subjected to a strong scraping motion between stiff brushes for the removal of the outer shell. Owing to the strength of the inner shells of the nuts no particular care is required to prevent injury thereto and the apparatus can be constructed of sufficient strength for its intended purpose without fear of injury to the nuts being treated.

The arrangement of the upper and lower rotating brushes so that they rotate in opposite directions not only promotes the desired brushing operation and the resulting removal of the outer nut shells or husks, but it tends to equalize the rotating effect imparted to the outer brushes and shells during the dehusking operation.

The apparatus of the present invention is sufficiently compact and of relatively small size so that it can readily be transported to different places. It may thus be mounted upon a truck or car that carries the engine which supplies the power for its operation, and the apparatus as a whole may thus be portable. By using it where the palm nuts themselves occur, these nuts may be treated for the removal of their outer husks or shells so that they are then ready for the cracking operation or for transportation. The apparatus is nevertheless sufficiently large to enable a large number of palm nuts to be continually treated and freed from their outer shells or husks.

The preliminary removal of the outer husk or shell leaves the nuts with their hard inner shells clean and freed from adhering fiber. They are accordingly better adapted for the cracking operation, as well as for shipment. The inner shells are thus enhanced in value for certain purposes, for example, in making fine charcoal, etc.

I claim:

1. An apparatus for removing the outer shell or husk from cohune nuts and the like, comprising an outer series of brushes and an inner series of brushes, each providing a substantially continuous brushing surface, such brushes being vertically arranged and spaced apart a suitable distance for the passage of the nuts therebetween and one series of brushes being arranged to rotate with respect to the other, and means for supplying water to the space between said brushes, whereby the nuts and water are caused to progress downwardly between the said brushes and the nuts subjected to a combined rubbing, scraping and washing action, substantially as described.

2. An apparatus for removing the outer shell or husk from cohune nuts and the like, comprising an outer circular shell having a series of brushes secured to the inner portion thereof and forming a substantially continuous brushing surface, an inner shell having a series of brushes secured to the outer portion thereof and forming a substantially continuous brushing surface, said two shells being smaller at their lower ends than at their upper ends, and spaced apart a sufficient distance to permit the nuts to be gradually progressed therebetween, means for rotating one of said series of brushes with respect to the other, and means for supplying water to the space between said brushes, whereby the nuts fed between the series of brushes are subjected to rotation and to a combined rubbing, scraping and washing action; substantially as described.

3. An apparatus for removing the outer shell or husk from cohune nuts and the like, comprising an outer stationary shell having a series of substantially continuous brushes secured to the inner portion thereof, an inner shell divided into two parts, each having a substantially continuous series of brushes secured to the outer portion thereof, and spaced apart from the outer series of brushes a sufficient distance to permit the nuts to be gradually progressed therebetween, said inner and outer shells being smaller at their lower ends than at their upper ends, means for rotating the two parts of said inner shell and their brushes in opposite directions, and means for supplying water to the space between said series of brushes; substantially as described.

In testimony whereof I affix my signature.

FREDERIC A. G. PAPE.